US00RE45201E

(19) United States
(12) Reissued Patent
Sanford

(10) Patent Number: US RE45,201 E
(45) Date of Reissued Patent: *Oct. 21, 2014

(54) SYSTEMS AND METHOD FOR IMAGE PROCESSING

(71) Applicant: Facebook, Inc, Menlo Park, CA (US)

(72) Inventor: Richard M. Sanford, Seattle, WA (US)

(73) Assignee: Facebook, Inc., Menlo Park, CA (US)

( * ) Notice: This patent is subject to a terminal disclaimer.

(21) Appl. No.: 13/630,973

(22) Filed: Sep. 28, 2012

Related U.S. Patent Documents

Reissue of:

(64) Patent No.: 7,805,007
Issued: Sep. 28, 2010
Appl. No.: 12/752,320
Filed: Apr. 1, 2010

U.S. Applications:

(63) Continuation of application No. 11/557,420, filed on Nov. 7, 2006, now Pat. No. 7,711,193.

(51) Int. Cl.
*G06K 9/48* (2006.01)
*G06F 3/00* (2006.01)
*G06F 13/00* (2006.01)

(52) U.S. Cl.
USPC ..... 382/199; 725/32; 725/42; 725/52; 348/571

(58) Field of Classification Search
USPC ..... 382/199; 725/32, 42, 52; 348/571; 386/52
See application file for complete search history.

(56) References Cited

U.S. PATENT DOCUMENTS 5,835,163 A 11/1998 Liou et al.
6,084,988 A * 7/2000 Kanno et al. ..... 382/289
6,263,118 B1 * 7/2001 Kanno et al. ..... 382/289
6,587,115 B2 * 7/2003 Gong et al. ..... 345/596
6,804,294 B1 * 10/2004 Hartung et al. ..... 375/240
7,042,525 B1 5/2006 Yu
7,697,149 B2 * 4/2010 Tanaka et al. ..... 358/1.13
7,711,193 B2 * 5/2010 Sanford ..... 382/199
7,751,071 B2 * 7/2010 Namizuka ..... 358/1.13
7,805,007 B2 * 9/2010 Sanford ..... 382/199
7,853,079 B1 * 12/2010 Shrivastava et al. ..... 382/173

(Continued)

OTHER PUBLICATIONS

Dufaux, Frederic, "Key Frame Selection to Represent a Video," Compaq Computer Corp., Cambridge Research Lab. 2000 International Conference on Image Processing; vol. II of III, Sep. 10-13, 2000. Sponsors: Institute of Electrical and Electronics Engineers Signal Processing Society.

(Continued)

*Primary Examiner* — Aaron W Carter
(74) *Attorney, Agent, or Firm* — Keller Jolley Preece

(57) ABSTRACT

A facility is provided for recognizing blank and nearly blank images. In various embodiments, the facility receives an indication of an image, creates an analysis image based on the received image by detecting edges, determines an edge ratio for the analysis image, determines whether the edge ratio exceeds a threshold and, when the edge ratio does not exceed the threshold, identifies the received image as a blank image. The facility can include an edge detector component that creates an analysis image based on a selected image by detecting edges in the selected image, a calculator component that calculates an edge ratio for the analysis image, and an analysis component that determines whether the calculated edge ratio exceeds a threshold.

31 Claims, 8 Drawing Sheets

(56) References Cited

U.S. PATENT DOCUMENTS

| | | | | |
|---|---|---|---|---|
| 7,899,257 | B2 * | 3/2011 | Sanford | 382/199 |
| 7,912,303 | B2 * | 3/2011 | Suh | 382/236 |
| 7,983,488 | B2 * | 7/2011 | Sanford | 382/199 |
| 7,986,372 | B2 * | 7/2011 | Ma et al. | 348/700 |
| 7,990,475 | B1 * | 8/2011 | Sarangi et al. | 348/699 |
| 8,249,167 | B2 * | 8/2012 | Kim | 375/240.25 |
| 8,259,812 | B2 * | 9/2012 | Kim | 375/240.25 |
| 8,407,363 | B2 * | 3/2013 | Dote et al. | 709/232 |
| 2002/0114504 | A1 * | 8/2002 | Shinbata | 382/132 |
| 2004/0095396 | A1 | 5/2004 | Stavely et al. | |
| 2004/0128317 | A1 * | 7/2004 | Sull et al. | 707/104.1 |
| 2005/0190382 | A1 * | 9/2005 | van Os | 358/1.1 |
| 2005/0200903 | A1 * | 9/2005 | Okubo | 358/3.24 |
| 2005/0240967 | A1 * | 10/2005 | Anderson et al. | 725/52 |
| 2006/0026524 | A1 * | 2/2006 | Ma et al. | 715/713 |
| 2006/0107289 | A1 * | 5/2006 | DeYonker et al. | 725/37 |
| 2006/0110057 | A1 * | 5/2006 | Liu et al. | 382/233 |
| 2006/0153456 | A1 * | 7/2006 | Foote | 382/190 |
| 2006/0195859 | A1 * | 8/2006 | Konig et al. | 725/19 |
| 2006/0221410 | A1 * | 10/2006 | Suzuki | 358/463 |
| 2007/0268966 | A1 | 11/2007 | Kim | |
| 2008/0016469 | A1 * | 1/2008 | Suh | 715/838 |
| 2008/0031595 | A1 * | 2/2008 | Cho | 386/108 |
| 2008/0066107 | A1 * | 3/2008 | Moonka et al. | 725/42 |
| 2008/0107343 | A1 * | 5/2008 | Sanford | 382/199 |
| 2008/0118226 | A1 * | 5/2008 | Kim | 386/109 |
| 2008/0127244 | A1 * | 5/2008 | Zhang | 725/32 |
| 2008/0181301 | A1 * | 7/2008 | Kim | 375/240.03 |
| 2008/0291492 | A1 * | 11/2008 | Miyagi et al. | 358/1.15 |
| 2009/0097076 | A1 * | 4/2009 | Fujiwara | 358/448 |
| 2009/0116738 | A1 * | 5/2009 | Kubota | 382/165 |
| 2009/0214112 | A1 * | 8/2009 | Borrey et al. | 382/167 |
| 2009/0285551 | A1 * | 11/2009 | Berry | 386/95 |
| 2010/0053682 | A1 * | 3/2010 | Gotoh et al. | 358/1.15 |
| 2010/0182618 | A1 * | 7/2010 | Akiyama et al. | 358/1.9 |
| 2010/0189347 | A1 * | 7/2010 | Sanford | 382/165 |
| 2011/0289531 | A1 * | 11/2011 | Moonka et al. | 725/38 |
| 2012/0081766 | A1 * | 4/2012 | Mori | 358/505 |
| 2012/0203924 | A1 * | 8/2012 | Dote et al. | 709/232 |

OTHER PUBLICATIONS

U.S. Appl. No. 11/557,420, filed Dec. 15, 2009, Notice of Allowance.
U.S. Appl. No. 12/752,320, filed Jun. 1, 2010, Notice of Allowance.
U.S. Appl. No. 12/873,504, filed Oct. 29, 2010, Notice of Allowance.
U.S. Appl. No. 13/025,269, filed Mar. 17 2011, Notice of Allowance.

* cited by examiner

SYSTEMS AND METHOD FOR IMAGE PROCESSING

Matter enclosed in heavy brackets [ ] appears in the original patent but forms no part of this reissue specification; matter printed in italics indicates the additions made by reissue.

This application is a continuation of and claims the benefit of priority of U.S. application Ser. No. 11/557,420 (now U.S. Pat. No. 7,711,193), filed Nov. 7, 2006, the entire contents of which are incorporated herein by reference.

BACKGROUND

Images sometimes need to be analyzed to determine whether they are blank or nearly blank. An image is blank when it appears to a user to be a single, solid color. An image is nearly blank when a dominating portion of it appears to a user to be a single, solid color. An example of a nearly blank image is a black screen with a corporate or television network logo appearing in a portion (e.g., corner) of the screen. Such a nearly blank screen may be displayed by a television network between a program and an advertisement. Because nearly blank images can be considered to be blank from a viewer's perspective, the term "blank" in this specification includes actually blank and nearly blank.

An image that is selected from a video may need to be analyzed to determine whether it is blank. A video is generally a sequence of images (e.g., "frames"), or a sequential set of key frames and delta frames. A key frame describes an image completely and delta frames describe portions of the key frame's image that change before a subsequent key frame is received from the sequence. An image can be selected from the video to identify the video. As an example, an Internet World Wide Web ("Web") page may display a "thumbnail" image to identify a linked video. When a user viewing the Web page selects the thumbnail image, the linked video may play.

The image may be selected automatically. As an example, when a Web site enables users to upload videos, the Web site may automatically select a thumbnail image to associate with the video to provide a link to the video. Commonly, the image is selected from a frame near the beginning of the video, end of the video, or randomly. Sometimes, the automatically selected image is blank. This can occur because some videos have transitions from a solid color (commonly white or black), such as near the beginning of the video.

When the selected image is blank, the image is not a useful thumbnail image because a user viewing a Web page containing the blank image would not readily know to which video the image relates. It is thus desirable to select images that are not blank.

DETAILED DESCRIPTION

Figure 1A:
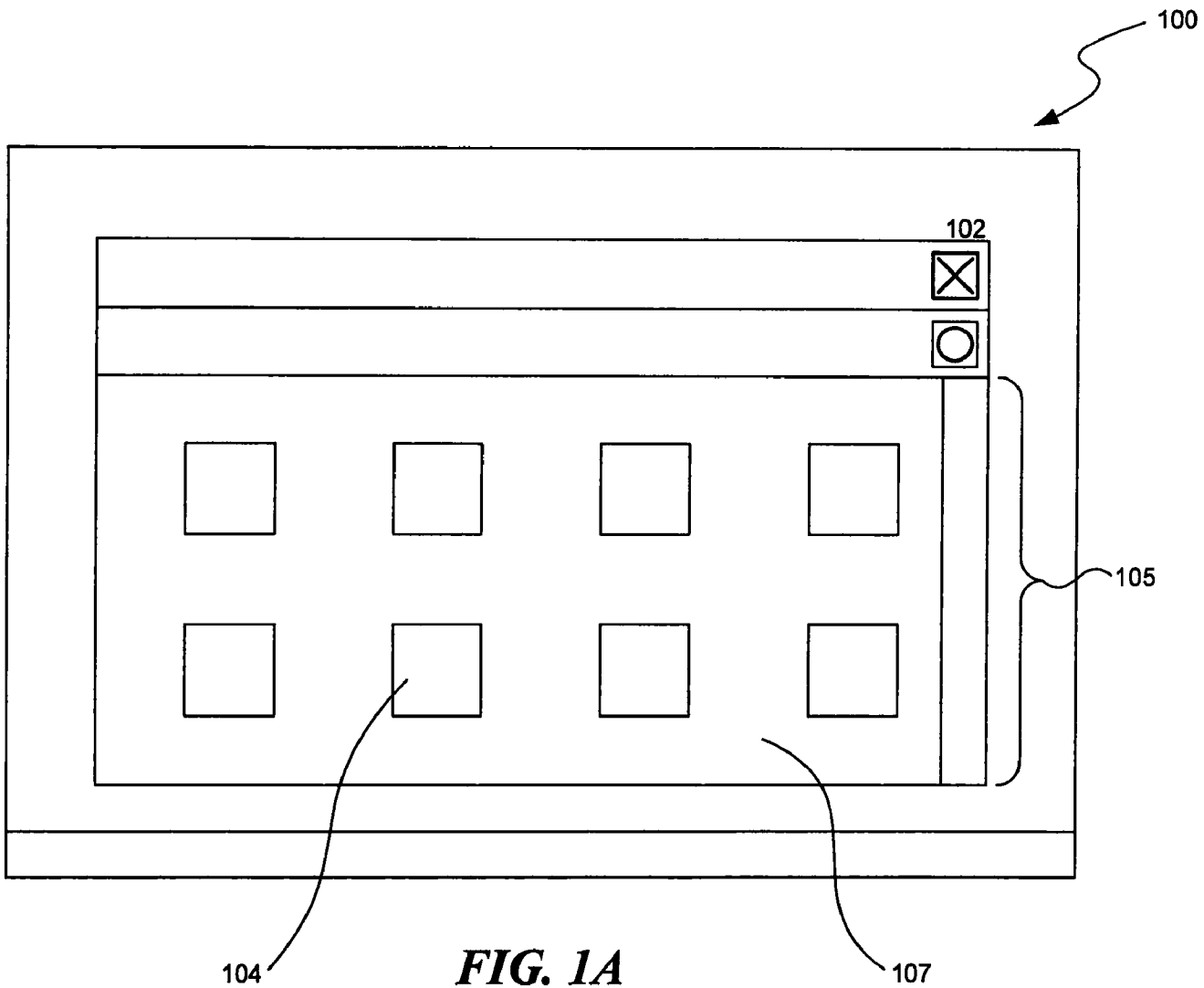
FIG. 1A is a user interface diagram illustrating a Web page containing several thumbnail images.

A facility is provided for recognizing blank and nearly blank images (jointly, "blank images"). In various embodiments, the facility selects a frame from a video, employs an edge-detection algorithm to detect edges in the selected frame, creates an analysis frame containing the detected edges, calculates an edge ratio associated with the analysis frame, and determines whether the calculated edge ratio indicates whether or not the frame is blank. A nearly blank frame is considered to be blank. The facility can employ any commonly employed edge-detection algorithm. The edge detection algorithm may have a pixel variance factor that can be changed to select the sensitivity of edge detection. The facility may employ the pixel variance factor when determining whether a pixel is a part of an edge. The facility may also employ an edge ratio threshold that can be changed to select the edge ratio. By detecting edges and analyzing the edge ratio, the facility is able to determine whether or not a selected image is blank. When the selected image is blank, the facility can select another frame from the video and repeat the analysis.

The facility can use various algorithms to select a frame for analysis. The facility may indicate to these algorithms to select a frame from a specified portion of the video. In some embodiments, the facility may employ a scene detection algorithm to select a frame based on the screen's content. An example of a scene detection algorithm is described in Frédéric Dufaux, Key frame selection to represent a video, 275-278 (Proceedings of the IEEE Signal Processing Society's 2000 International Conference on Image Processing, 2000), which is incorporated herein by reference in its entirety. In other embodiments, the facility may select a frame randomly, such as from the portion of the video the facility specifies. In other embodiments, the facility may select frames in a video sequentially, starting with the first frame.

The facility employs an edge detection algorithm to detect edges in the selected frame. There are many algorithms available for edge detection. One or more edge detection algorithms can be employed to create an analysis image based on a source image. An example of an edge detection algorithm is spatial convolution. A type of spatial convolution can be represented by equation 1:

$$M = \begin{bmatrix} 0.0 & -1.0 & 0.0 \\ -1.0 & 4.0 & -1.0 \\ 0.0 & -1.0 & 0.0 \end{bmatrix} \tag{1}$$

$$C_{x,y} = \frac{\sum\sum P_{x,y} M_{i,j}}{\sum\sum M_{i,j}}$$

The facility can employ equation 1 when determining a color values for a destination pixel in the analysis image based on a source pixel of the selected image. For each source pixel, $P_{x,y}$ the convolution equation calculates a destination pixel, $C_{x,y}$. Each value of the source pixel (e.g., each color component's value) can undergo the convolution. As an example suppose source pixel $P_{x,y}$ has color values ($R_P$, $G_P$, $B_P$). The color values for destination pixel $C_{x,y}$ would be ($R_C$, $G_C$, $B_C$). Each color component of the destination pixel (e.g., $R_C$, $G_C$, or $B_C$) can be determined from the corresponding color value of the source pixel using the equation by substituting the color values for $P_{x,y}$ and $C_{x,y}$.

A convolution mask, M, indicates which pixel's values are to be included in the convolution. In equation 1, M indicates that the eight pixels surrounding the subject pixel are to be included. The pixels immediately below, above, and to the right have mask values of −1.0. The pixels at the diagonal locations have mask values 0.

Each element in M is multiplied by the corresponding pixel value adjacent to each source pixel, $P_{x,y}$, in the source image, P. The results of the multiplications are summed and the sum is divided by the sum of the convolution matrix's values. The result of the division is a pixel, $C_{x,y}$, in the convolution output image, C, which is the analysis image.

Thus, this convolution equation cancels out colors of destination pixels when neighboring pixels of the source pixel have equal color values. If pixels surrounding the source pixel have the same colors, the destination pixel is colored black. In various embodiments, a black pixel can be represented by color values (0,0,0) and a non-black pixel can be represented by having at least one color component that is non-zero.

The facility calculates an edge ratio for the analysis image by calculating the number of black and non-black pixels in the analysis image. This edge ratio is computed by dividing the number of non-black pixels by the number of black pixels. This quotient (edge ratio) is compared to an edge ratio threshold. When the ratio is less than or equal to an edge ratio threshold of approximately 0.023, the facility may determine that the image is blank or nearly blank. This edge ratio threshold can be varied, such as programmatically or via user input. As the edge ratio threshold is raised, more images may be considered to be non-blank. Conversely, when the edge ratio threshold is lowered, more images may be considered to be blank or nearly blank.

Turning now to the figures, FIG. 1A is a user interface diagram illustrating a Web page containing several thumbnail images. A display 100 of a computing device a user employs can display an Internet browser 102. The Internet browser displays a Web page within its window 105. When the user navigates to a Web page, such as Web page 107, that links to one or more videos, the Web page may show one or more thumbnails 104. When the user selects a thumbnail, such as by clicking a mouse pointer on the thumbnail, a video associated with the thumbnail may be displayed.

Figure 1B:
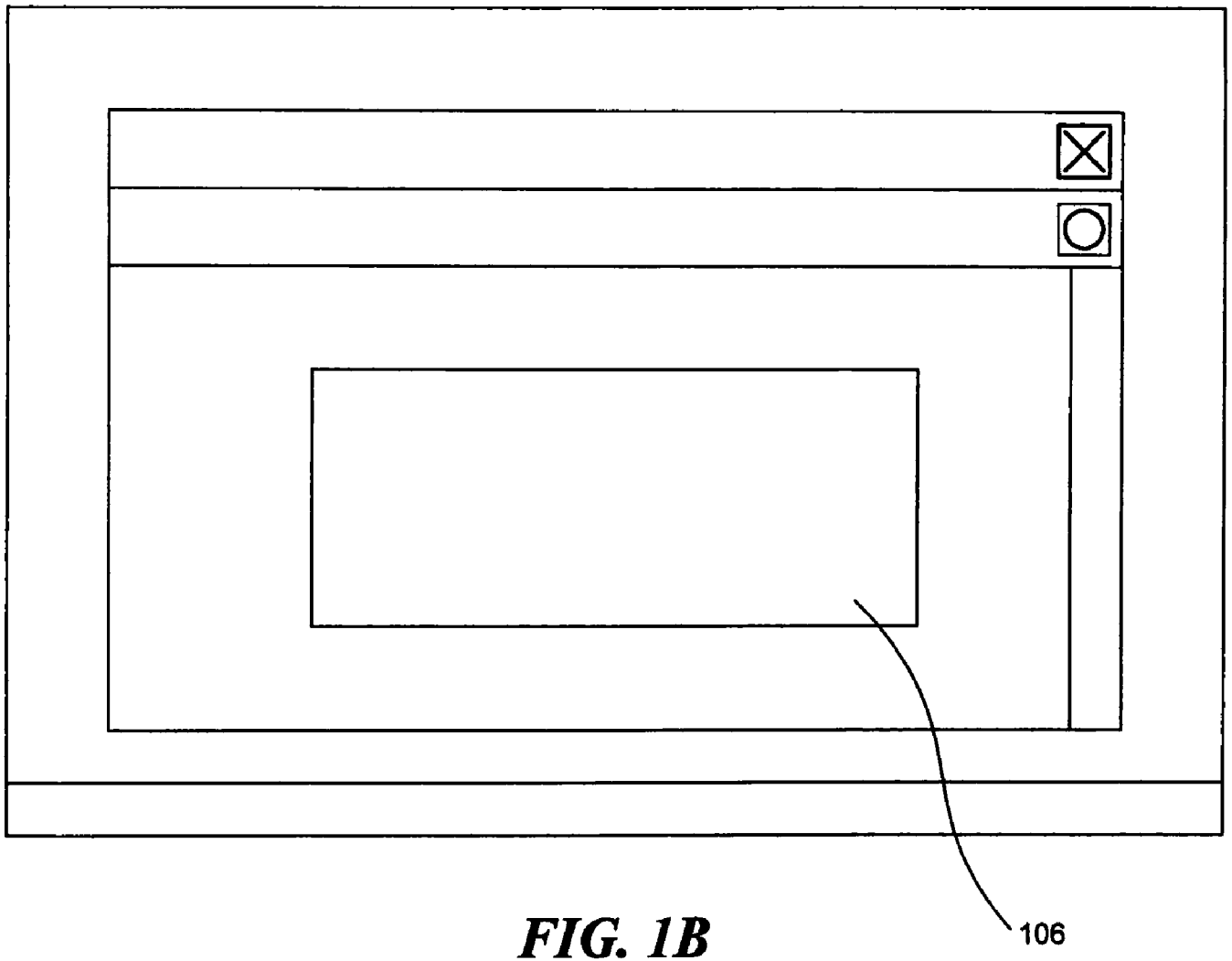
FIG. 1B is a user interface diagram illustrating a Web page containing a video associated with a selected thumbnail image.

FIG. 1B is a user interface diagram illustrating a Web page containing a video associated with a selected thumbnail image. The Web page may embed an object, such as a video viewer object, to display a video in a video region 106 when a user selects a thumbnail.

Figure 2A:
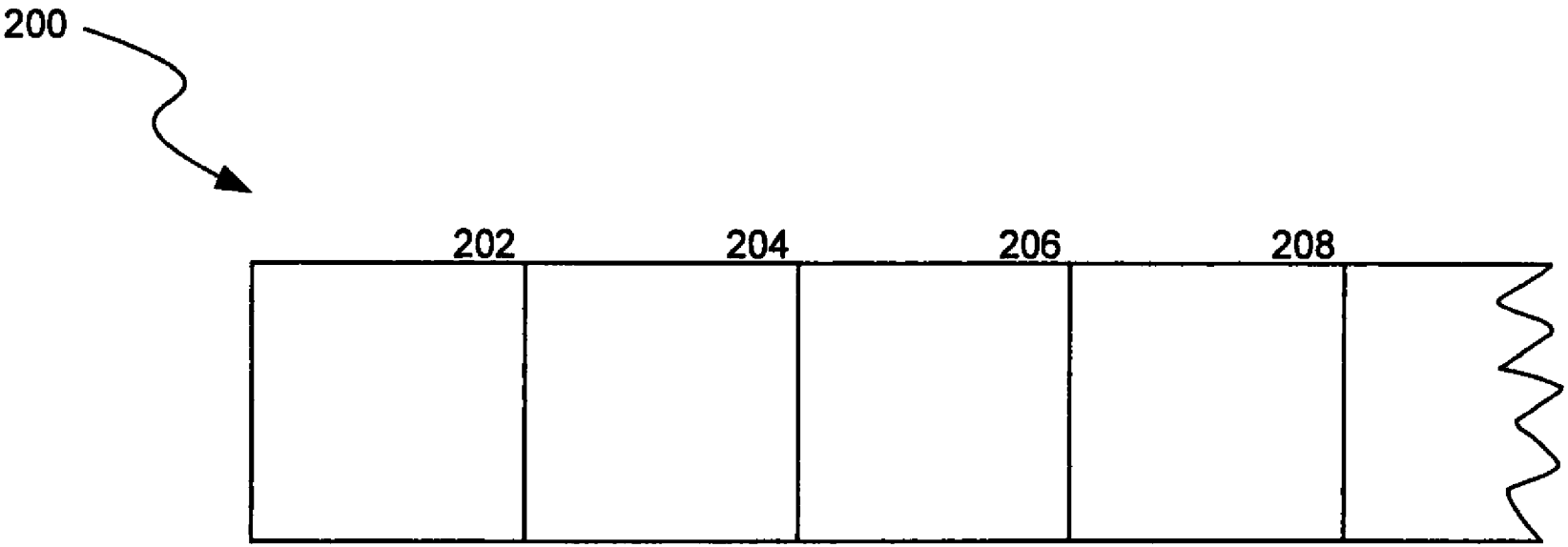
FIGS. 2A and 2B are block diagrams illustrating portions of videos.
Figure 2B:
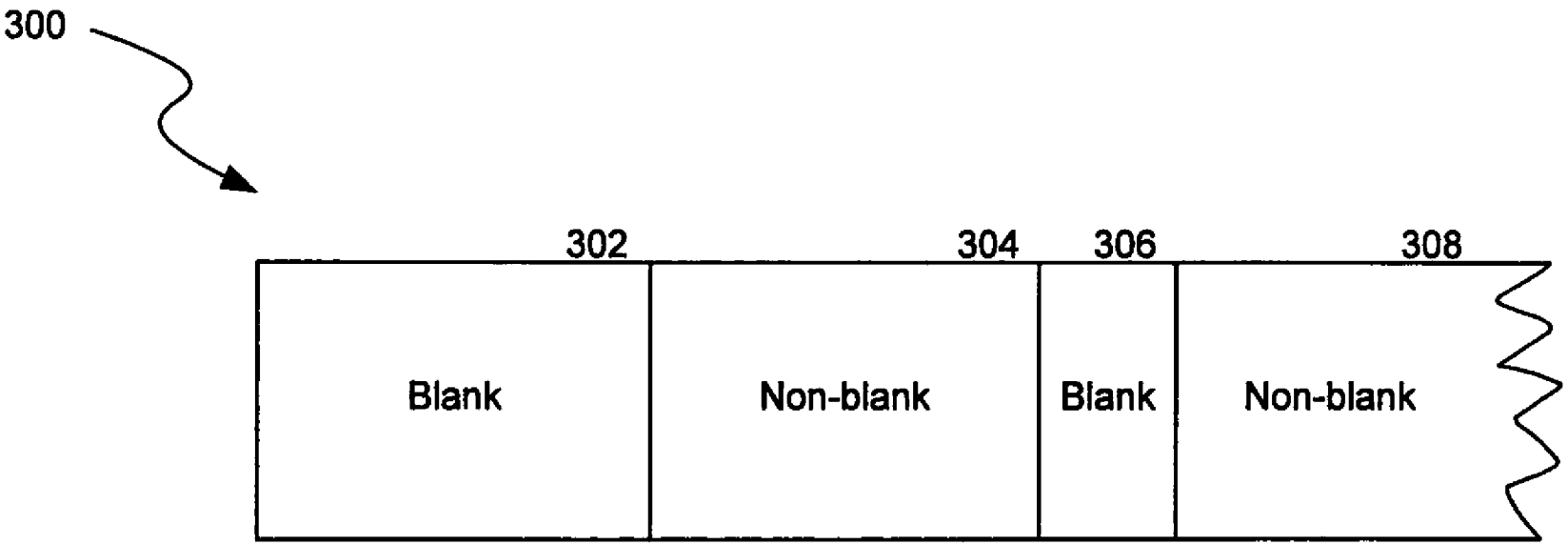

FIGS. 2A and 2B are block diagrams illustrating portions of videos. FIG. 2 illustrates a portion of a video 200 comprising frames 202, 204, 206, and 208. The frames can be a combination of key frames and delta frames. Alternatively, each frame may be a key frame. As previously discussed, a key frame describes an entire image whereas a delta frame describes changes to an image described by a prior key frame. Each frame may also identify whether it is a key frame or delta frame. A video can have sequences of frames that are blank (e.g., actually blank or nearly blank) or non-blank. As an example, a portion of a video illustrated in FIG. 2B has sequences of frames that are blank (302 and 306) and other sequences of frames that are not blank (304 and 308). Blank sequences 302 and 306 may be transitions between the non-blank sequences.

Figure 3A:
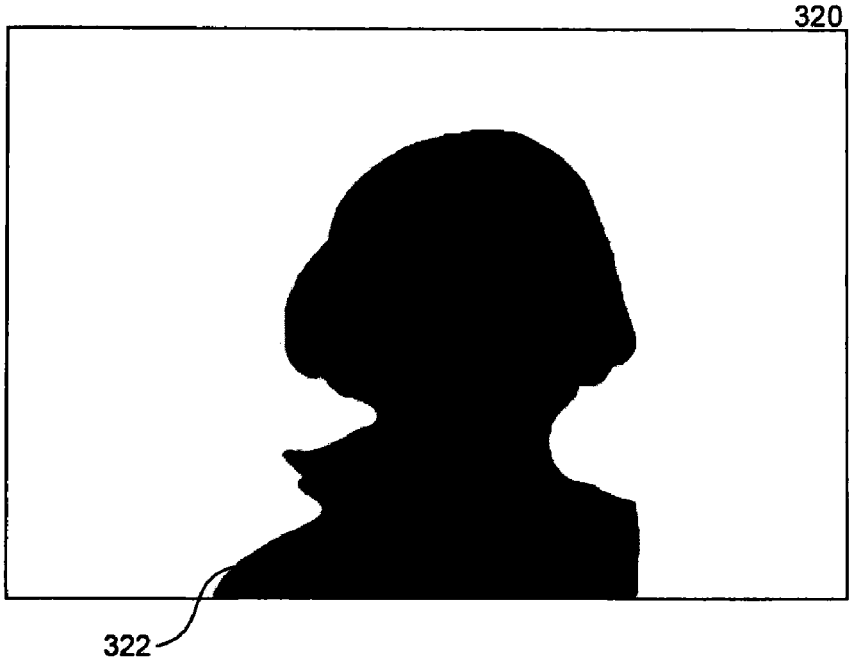
FIG. 3A is a frame illustrating an image.

FIG. 3A is a frame illustrating an image. The frame 320 contains an image 322. Although the image is depicted in the illustration as black, it can be one or more colors. As an example, the image may be an actual photograph.

Figure 3B:
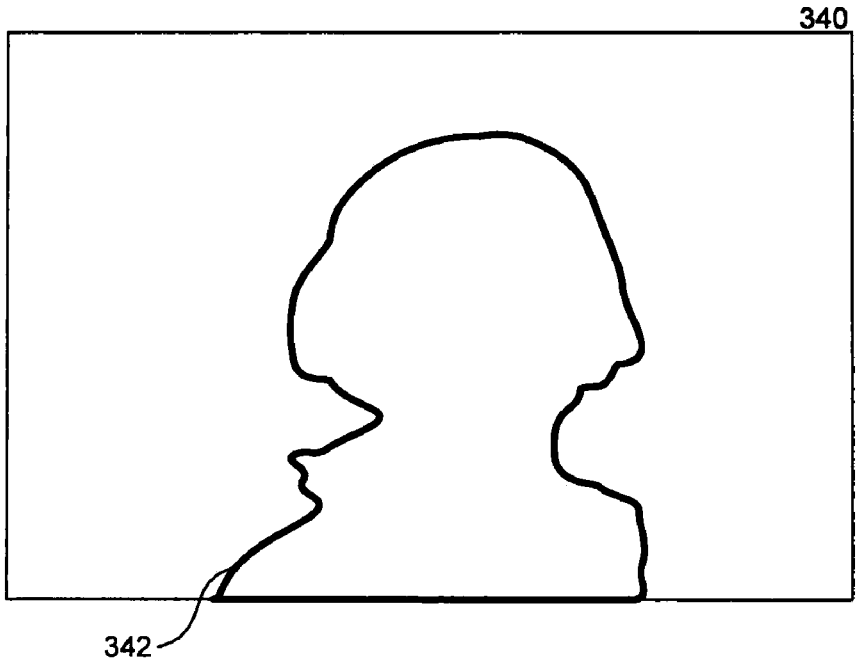
FIG. 3B is an analysis frame.

FIG. 3B is an analysis frame. The analysis frame indicates edges an edge detector detected in the selected frame. Edge 342 corresponds to image 320. Although the illustrated edge is depicted in black, it may be depicted in white or the color of the original image.

Figure 4:
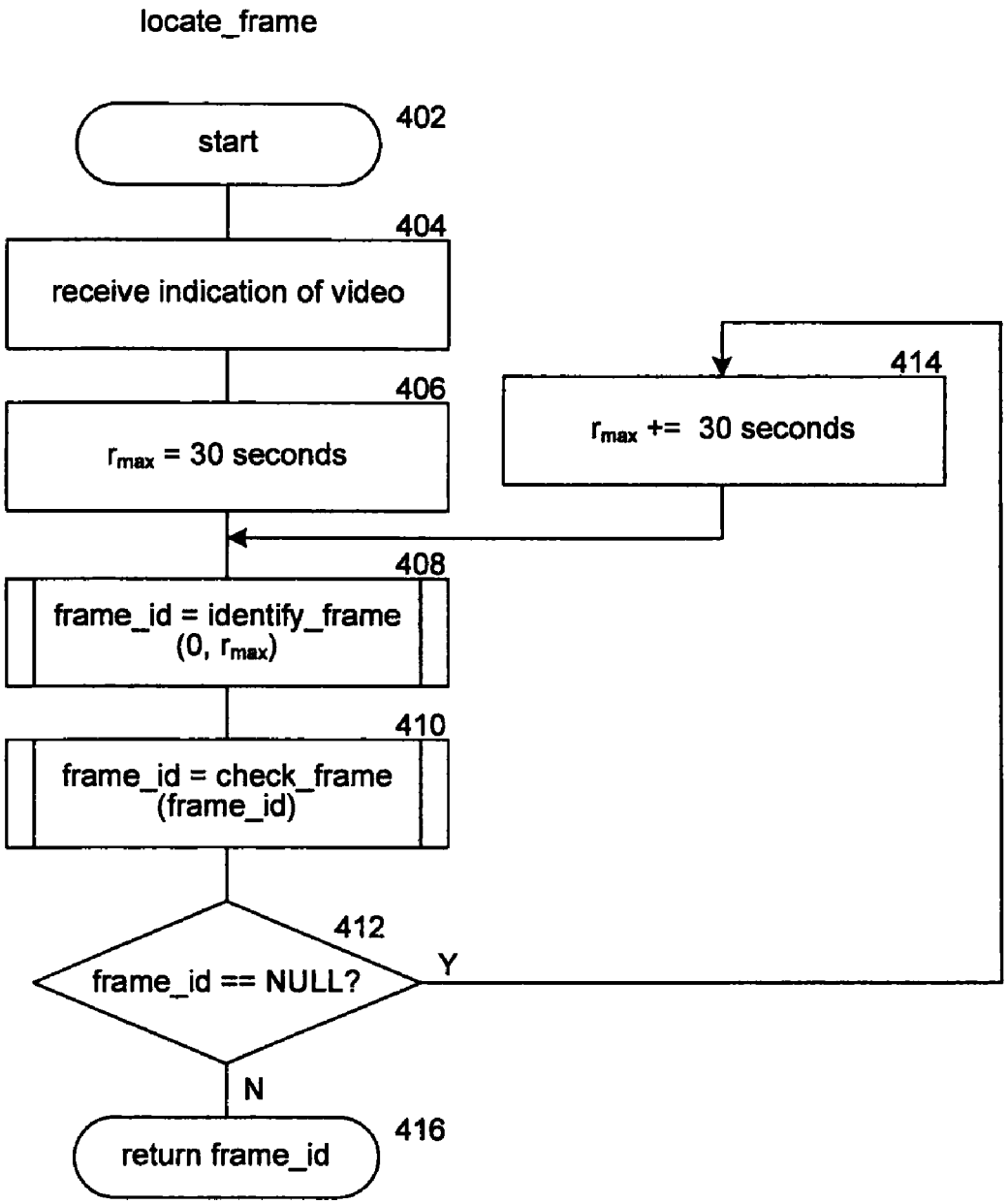
FIG. 4 is a flow diagram illustrating a locate_frame routine invoked by the facility in some embodiments.

FIG. 4 is a flow diagram illustrating a locate_frame routine invoked by the facility in some embodiments. The facility may invoke the routine to locate a frame in a video, such as to identify a thumbnail image. The routine begins at block 402.

At block 404, the routine receives an indication of a video. As an example, the routine may receive an indication of a file location at which the video is stored.

At block 406, the routine selects a portion of the video from which to locate a frame. As an example, the routine may select as a range the first thirty seconds of the video.

At block 408, the routine invokes an identify_frame subroutine to select a frame from the video. The routine may provide an indication of the portion of the video from which to select a frame, such as from the beginning to thirty seconds. The identify_frame subroutine may use one or more of various algorithms to select a frame. As an example, the subroutine may use a scene selection algorithm, random selection, first frame, etc.

At block 410, the routine invokes a check_frame subroutine to determine whether the selected frame appears to be blank. In some embodiments, the check_frame subroutine returns NULL to indicate that the selected frame is blank. The check_frame subroutine is described in further detail below in relation to FIG. 5.

At decision block 412, the algorithm determines, based on the check_frame subroutine's return value, whether the frame appears to be blank. If the frame appears to be blank, the routine continues at block 414. Otherwise, the routine continues at block 416, where it returns an indication of the selected frame.

At block 414, the routine selects another portion of the video from which to select a frame. As an example, the routine may add 30 seconds to the range identified at block 406.

Figure 5:
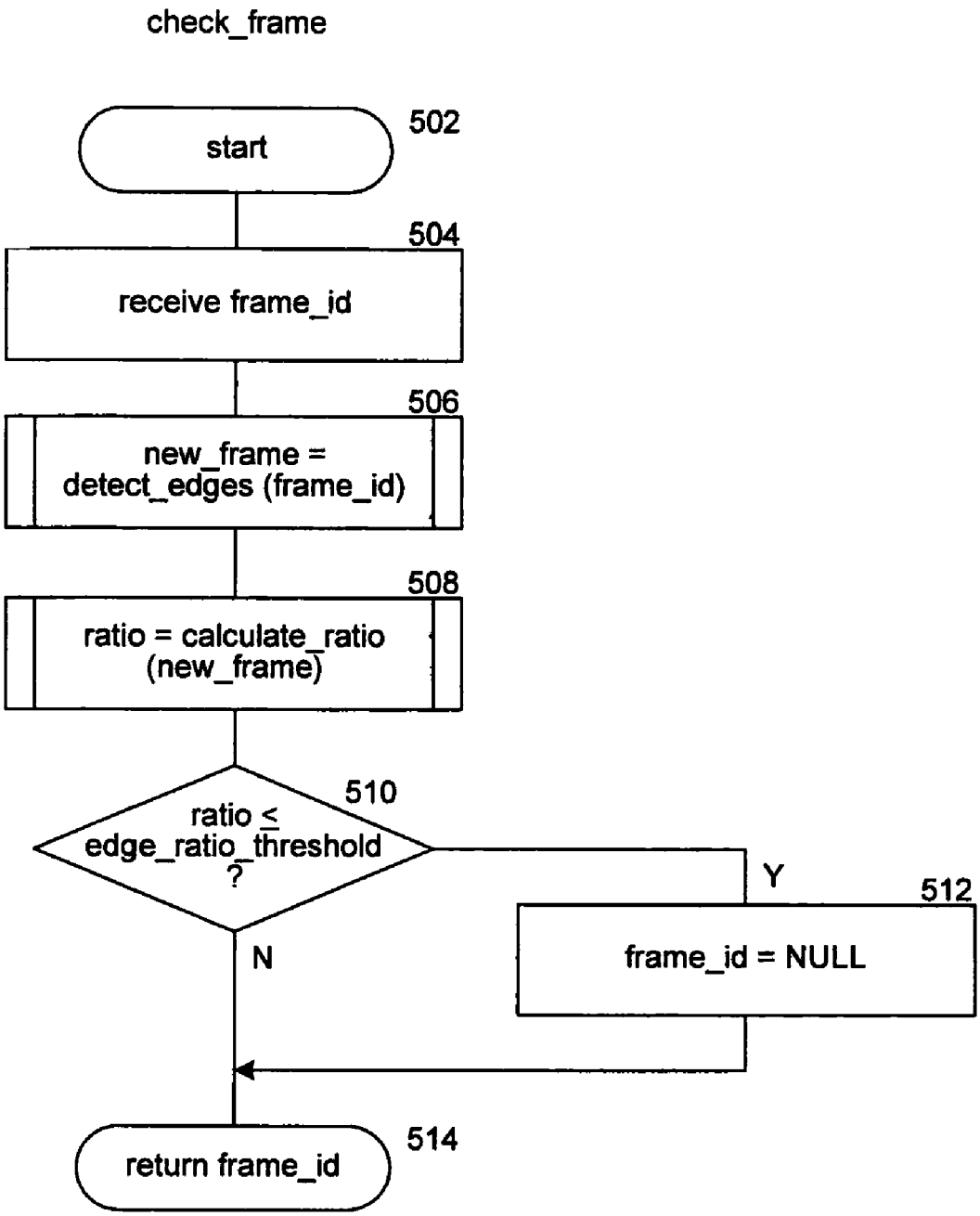
FIG. 5 is a flow diagram illustrating a check_frame routine invoked by the facility in some embodiments.

FIG. 5 is a flow diagram illustrating a check_frame routine invoked by the facility in some embodiments. The facility may invoke the routine to determine whether a selected frame is blank. The routine begins at block 502.

At block 504, the routine receives an indication of a frame. The routine initially sets a frame identifier to identify the indicated frame. The routine may also receive an indication of a video from which the frame was selected.

At block 506, the routine invokes a detect_edges subroutine. In various embodiments, the detect_edges subroutine may receive an indication of a frame and a video from which the frame was selected, and provide a new frame in which edges are identified. The new frame is an analysis frame that the facility can use to determine whether the frame is blank. The detect_edges subroutine may employ any suitable edge detection algorithm. Examples of edge detection algorithms include convolution (described above), Canny, Sobel, and Laplacian edge detectors.

At block 508, the routine invokes a calculate_ratio subroutine to calculate a ratio of non-black to black pixels (e.g., edge ratio) in the new frame returned by the detect_edges subroutine. The calculate_ratio subroutine is described in further detail below in relation to FIG. 6.

At decision block 510, the routine determines whether the ratio returned by the calculate_ratio subroutine is smaller than or equal to an edge ratio threshold. If the routine is less than or equal to the edge ratio threshold, the routine continues at block 512. Otherwise, the routine continues at block 514. In various embodiments, the check_frame routine may also receive an indication of the edge ratio threshold at block 504, e.g., so as to configure the routine.

At block 512, the routine sets the frame identifier to NULL to indicate that the frame appears to be blank.

At block 514, the routine returns the frame identifier.

Figure 6:
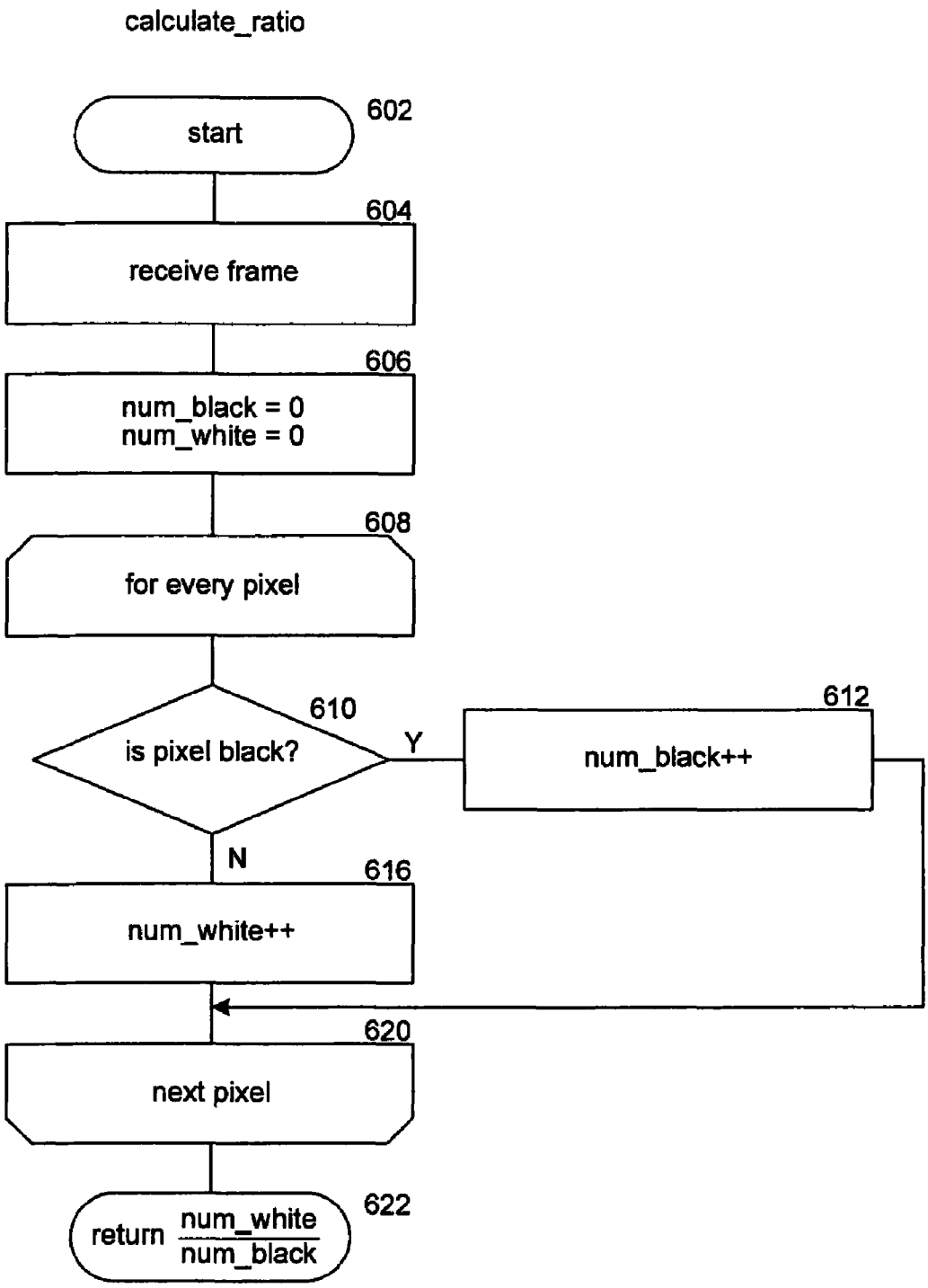
FIG. 6 is a flow diagram illustrating a calculate_ratio routine invoked by the facility in some embodiments.

FIG. 6 is a flow diagram illustrating a calculate_ratio routine invoked by the facility in some embodiments. The facility may invoke the routine to calculate an edge ratio. The routine begins at block 602.

At block 604, the routine receives a frame. The frame may be an analysis frame that identifies edges that were detected by an edge detection algorithm in a frame selected from a video.

At block 606, the routine sets to zero counters indicating the number of black ("num_black") pixels and the number of non-black ("num_white") pixels.

Between the loop of blocks 608-620, the routine counts the number of black and non-black pixels. At block 608, the routine selects a pixel.

At decision block 610, the routine determines whether the pixel is black. If the pixel is black, the routine continues at block 612. Otherwise, the routine continues at block 616.

At block 612, the routine increments the counter for black pixels and then continues at block 620.

At block 616, the routine increments the counter for non-black pixels.

At block 620, the routine selects another pixel. If there are no further pixels, the routine continues at block 622 where it returns the quotient determined by dividing the number of non-black pixels by the number of black pixels. Otherwise, the routine continues at block 610.

While various embodiments are described in terms of the environment described above, those skilled in the art will appreciate that the facility may be implemented in a variety of other environments including a single, monolithic computer system, as well as various other combinations of computer systems or similar devices connected in various ways.

Those skilled in the art will appreciate that the logic illustrated in FIGS. 4-6 and in their associated descriptions may be altered in various ways. For example, the order of the logic may be rearranged; substeps may be performed in parallel; shown logic may be omitted or other logic may be included; etc.

It will be appreciated by those skilled in the art that the above-described facility may be straightforwardly adapted or extended in various ways. For example, the facility can be employed to recognize blank and nearly-blank images in general and not just from a video. While the foregoing description makes reference to particular embodiments, the scope of the invention is defined solely by the claims that follow and the elements recited therein.

I claim:

1. A computer-implemented method [for processing an image,] comprising:

[identifying at least one characteristic of the image;]

[determining a number of first colored pixels and a number of non-first colored pixels associated with the identified characteristic of the image;]

*randomly selecting an image from a video;* calculating, using a processor, a ratio for the image based on [the] *a* number of first colored pixels and [the] *a* number of non-first colored pixels;

comparing the ratio for the image with a threshold; and identifying the image as being blank based on the comparison of the ratio to the threshold.

2. The method of claim 1, wherein the first colored pixels are black pixels and the non-first colored pixels are non-black pixels.

3. The method of claim 2, wherein calculating the ratio for the image comprises calculating a quotient based on the number of black pixels and the number of non-black pixels.

4. The method of claim 1, wherein [the at least one characteristic of] the image comprises an edge.

5. The method of claim 4, further comprising:

detecting edge pixels in the image; and determining, based on the detected edge pixels, a number of black pixels and a number of non-black pixels.

6. The method of claim 4, wherein the ratio is an edge ratio.

7. The method of claim 1, wherein the image is associated with a frame in [a] *the* video.

8. The method of claim 7, further comprising:

generating a thumbnail image based on the frame when the image is not identified as being blank; and linking the thumbnail image to the video.

9. The method of claim 1, wherein identifying the image as being blank comprises identifying the image as being blank or nearly blank based on the comparison of the ratio to the threshold.

10. A non-transitory computer-readable storage medium storing computer-executable instructions [for processing an image] that, when executed by a processor, perform the steps of:

[identifying at least one characteristic of the image;]

[determining a number of first colored pixels and a number of non-first colored pixels associated with the identified characteristic of the image;]

*randomly selecting an image from a video;* calculating, using a processor, a ratio for the image based on [the] *a* number of first colored pixels and [the] *a* number of non-first colored pixels;

comparing the ratio for the image with a threshold; and identifying the image as being blank based on the comparison of the ratio to the threshold.

11. The computer-readable storage medium of claim 10, wherein the first colored pixels are black pixels and the non-first colored pixels are non-black pixels.

12. The computer-readable storage medium of claim 11, wherein calculating the ratio for the image comprises calculating a quotient based on the number of black pixels and the number of non-black pixels.

13. The computer-readable storage medium of claim 10, wherein [the at least one characteristic of] the image comprises an edge.

14. The computer-readable storage medium of claim 13, further storing instructions for:

detecting edge pixels in the image; and determining, based on the detected edge pixels, a number of black pixels and a number of non-black pixels.

15. The computer-readable storage medium of claim 13, wherein the ratio is an edge ratio.

16. The computer-readable storage medium of claim 10, wherein the image is associated with a frame in [a] *the* video.

17. The computer-readable storage medium of claim 16, further storing instructions for:

generating a thumbnail image based on the frame when the image is not identified as being blank; and linking the thumbnail image to the video.

18. The computer-readable storage medium of claim 10, wherein identifying the image as being blank comprises identifying the image as being blank or nearly blank based on the comparison of the ratio to the threshold.

19. A device [for processing an image,] comprising:

a storage for storing instructions; and a processor for executing the instructions to perform the steps of:

[identifying at least one characteristic of the image;]

[determining a number of first colored pixels and a number of non-first colored pixels associated with the identified characteristic of the image;]

*randomly selecting an image from a video;* calculating a ratio for the image based on [the] *a* number of first colored pixels and [the] *a* number of non-first colored pixels;

comparing the ratio for the image with a threshold; and identifying the image as being blank based on the comparison of the ratio to the threshold.

20. The device of claim 19, wherein the first colored pixels are black pixels and the non-first colored pixels are non-black pixels.

21. The device of claim 20, wherein calculating the ratio for the image comprises calculating a quotient based on the number of black pixels and the number of non-black pixels.

22. The device of claim 19, wherein [the at least one characteristic of] the image comprises an edge.

23. The device of claim 22, further storing instructions for:

detecting edge pixels in the image; and determining, based on the detected edge pixels, a number of black pixels and a number of non-black pixels.

24. The device of claim 22, wherein the ratio is an edge ratio.

25. The device of claim 19, wherein the image is associated with a frame in [a] *the* video.

26. The device of claim 25, further storing instructions for:

generating a thumbnail image based on the frame when the image is not identified as being blank; and linking the thumbnail image to the video.

27. The device of claim 19, wherein identifying the image as being blank comprises identifying the image as being blank or nearly blank based on the comparison of the ratio to the threshold.

*28. A computer-implemented method comprising:*

*randomly identifying a first frame within a video file;*

*determining, using a processor, that the first frame is blank;*

*randomly identifying a second frame within the video file;*

*determining that the second frame is not blank; and*

*generating a thumbnail representative of the video file using the second frame.*

*29. The method of claim 28, wherein determining that the first frame is blank comprises:*

*calculating an edge ratio for the first frame;*

*comparing the edge ratio to a threshold; and*

*determining that the first frame is blank based on the comparison of the edge ratio to the threshold.*

*30. A system for processing an image, comprising:*

*one or more processors configured to:*

*randomly identify a first frame within a video file;*

*determine that the first frame is blank;*

*randomly identify a second frame within the video file;*

*determine that the second frame is not blank; and*

*generate a thumbnail representative of the video file using the second frame.*

*31. The system of claim 30, wherein the one or more processors are further configured to:*

*calculate an edge ratio for the first frame;*

*compare the edge ratio to a threshold; and*

*determine that the first frame is blank based on the comparison of the edge ratio to the threshold.*

* * * * *